United States Patent [19]
Shibata et al.

[11] Patent Number: 5,363,005
[45] Date of Patent: Nov. 8, 1994

[54] MINIATURE MOTOR

[75] Inventors: Hisashi Shibata; Norihiro Sasaki; Yoshiaki Egawa, all of Chiba, Japan

[73] Assignee: Mabuchi Motor Co., Ltd., Matsudo, Japan

[21] Appl. No.: 179,517

[22] Filed: Jan. 10, 1994

[30] Foreign Application Priority Data

Jan. 14, 1993 [JP] Japan .................................. 000672

[51] Int. Cl.$^5$ .............................................. H02K 13/00
[52] U.S. Cl. .................................. 310/244; 310/220; 310/49 R
[58] Field of Search ............ 310/49 R, 49 MM, 68 R, 310/89, 156, 220, 238, 239, 244, 246

[56] References Cited

U.S. PATENT DOCUMENTS

| | | | |
|---|---|---|---|
| 3,714,481 | 1/1973 | Dijkstra | 310/244 |
| 4,749,899 | 6/1988 | Ishizawa et al. | 310/244 |
| 5,013,952 | 5/1991 | Sekine et al. | 310/244 X |

*Primary Examiner*—Mark O. Budd
*Attorney, Agent, or Firm*—McGlew and Tuttle

[57] ABSTRACT

A miniature motor comprising a housing made of a metallic material, formed into a bottomed hollow tubular shape and having a permanent magnet fixedly fitted to the inner circumferential surface thereof, a rotor consisting of an armature facing the permanent magnet and a commutator, an end cap engaged with an open end of the housing, and having brushes making sliding contact with the commutator and a pair of terminals electrically connected to the brushes; the rotor being rotatably supported by bearings provided on the bottom part of the housing and the end cap, in which a flat groove including a plane parallel to the axial line of the motor and opening toward the housing is provided on the end cap; the terminals being disposed to face the side of the groove, a chip laminated capacitor and a spring made of an electrically conductive material and formed into a substantially U shape in planar projection being disposed in the groove so as to come into contact with each other and also with the terminals.

3 Claims, 3 Drawing Sheets

MINIATURE MOTOR

BACKGROUND OF THE INVENTION AND RELATED ART STATEMENT

This invention relates generally to a miniature motor used in audio and video equipment, and automotive electrical equipment, and more particularly to a miniature motor which can be manufactured in small sizes, assembled easily, and in which electrical noise can be reduced.

FIG. 1 is a partially cross-sectional side view illustrating an example of miniature motor to which this invention is applied. In FIG. 1, reference numeral 31 refers to a housing made of a metallic material, such as mild steel, formed into a bottomed hollow tubular shape and having a permanent magnet 32 of an arc-segment shape, for example, fixedly fitted to the inner circumferential surface thereof. Numeral 33 refers to an end cap made of a thermoplastic resin material, for example, and formed in such a fashion as to engage with an open end of the housing 31. Next, numeral 34 refers to a rotor consisting of an armature 35 facing the permanent magnet 32 and a commutator 36, and rotatably supported by bearings 37 and 38 each provided on the housing 31 and the end cap 33.

Numeral 39 refers to a brush arm made of an electrically conductive material, formed into a strip shape, having a brush 40 making sliding contact with the commutator 36, and provided inside the end cap 33. Inside the end cap 33 also provided are a pair of terminals 41 and 41 electrically connected to the brush arms 39 and 39 so that power can be fed from an external d-c power source to the armature 35 via the brush arms 39 and 39, the brushes 40 and 40 and the commutator 36.

With the aforementioned construction, when power is fed to the armature 35, rotating force is imparted to the armature 35 placed in a magnetic field formed by the permanent magnet 32 fixedly fitted to the inner circumferential surface of the housing 31, causing the rotor 34 to rotate, driving various pieces of equipment connected to the rotor 34.

As means for reducing electrical noise in the aforementioned miniature motor, there can be a construction where the housing 31 is connected to one terminal 41 via a ground terminal 42 made of an electrical conductive material and formed into a flat sheet shape. As another such means, there can also be a construction where a capacitor 44 is connected across a pair of the terminals 41 and 41 via a lead wire 43, as shown in FIG. 3.

Examples of public knowledge include EP 509683, GB 2172754, GB 2173648, and GB 2103042.

In the construction shown in FIGS. 2 and 3, where the ground terminal 42, the capacitor 44 and other component members for reducing electrical noise are provided, an excess space has to be provided inside the equipment or system which is driven by the miniature motor. Furthermore, a space larger than necessary may have to be provided because the shape, size and mounting position of the component members for reducing electrical noise are uncertain.

Since the component members for reducing electrical noise have no interchangeability, separate jigs, tools and personnel have to be provided if multiple types of component members are needed. This could lead to lowered production efficiency.

In the construction shown in FIG. 3, the operation of connecting the lead wire 43 of the capacitor 44 to the terminal 41 is extremely troublesome, the soldering operation inevitably needed for wire connections, and the placement and cutting of the lead wires 43 involve a high degree of skills because of a very limited space around the location at which the capacitor 44 is installed. This could result in increased assembly time and manhours, leading to increased manufacturing cost. In addition, soldering in a limited space tends to cause unstable wire connections, lowering the strength of wire connections to vibration or impact during service. This could lead to deteriorated reliability of electrical connections.

SUMMARY OF THE INVENTION

It is the first object of this invention to provide a miniature motor that can be manufactured in small sizes.

It is the second object of this invention to provide a miniature motor that can be assembled easily.

It is the third object of this invention to provide a miniature motor that can reduce electrical noise.

DETAILED DESCRIPTION OF THE EMBODIMENTS

Figure 1:
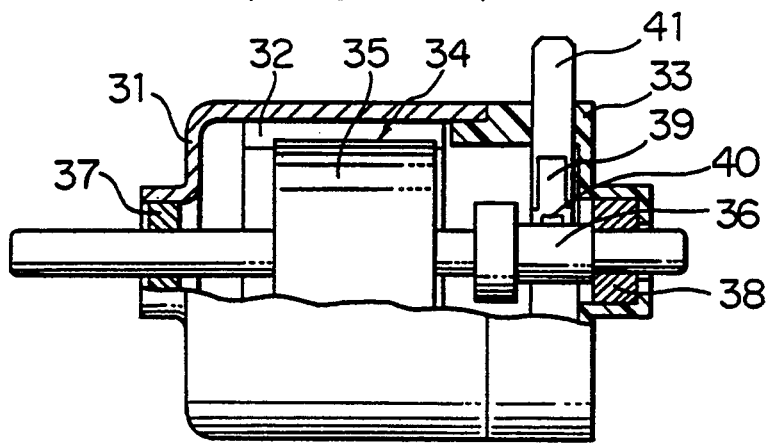
FIG. 1 is a partially cross-sectional side view illustrating an example of miniature motor to which this invention is applied.
Figure 2:
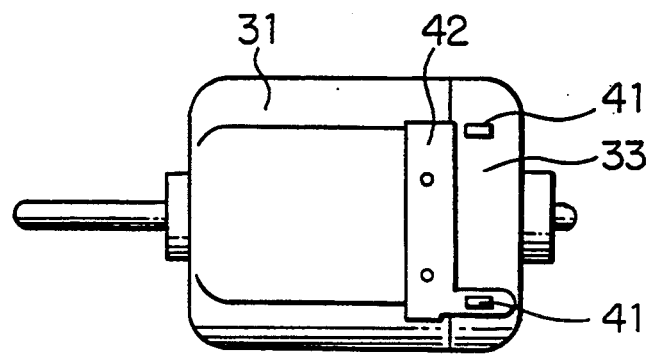
FIG. 2 is a plan view illustrating an example of electrical noise reduction means in a conventional type of miniature motor.
Figure 3:
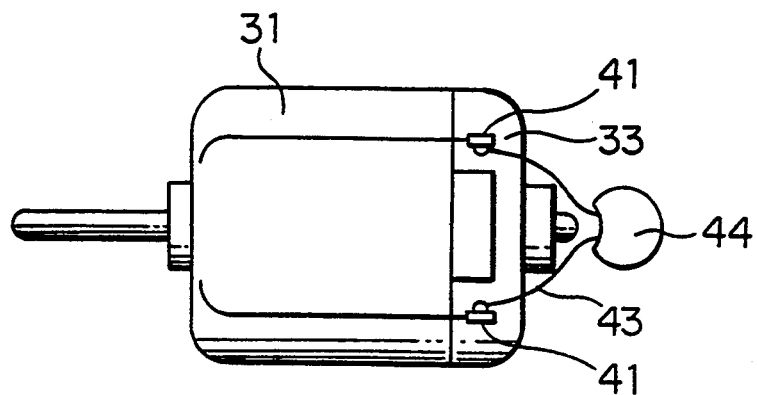
FIG. 3 is a plan view illustrating another example of electrical noise reduction means in a conventional type of miniature motor.
Figure 4:
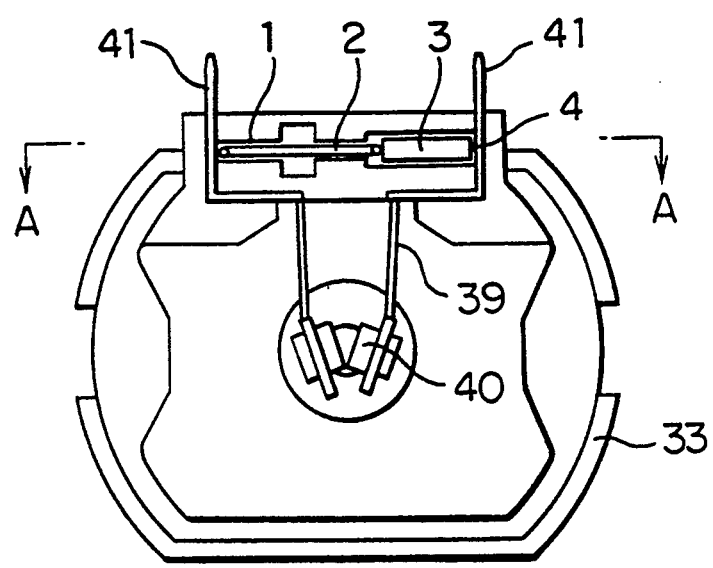
FIG. 4 is an inside end view illustrating an end cap in an embodiment of this invention.
Figure 5:
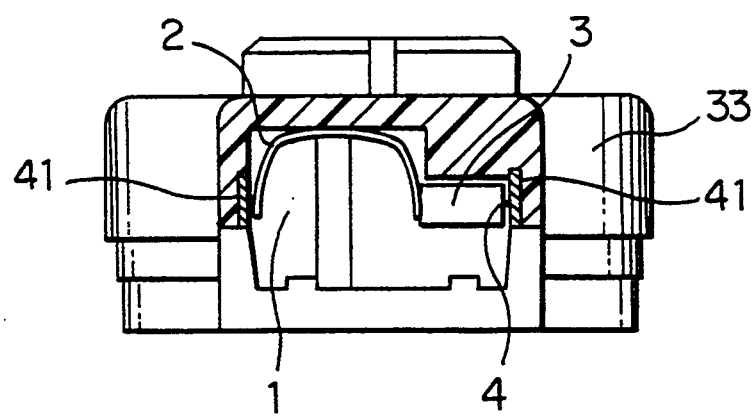
FIG. 5 is a cross-sectional view taken along line A—A in FIG. 4.

FIG. 4 is an inside end view illustrating an end cap in an embodiment of this invention. FIG. 5 is a cross-sectional view taken along line A—A in FIG. 4. Like parts are indicated by like numerals used in FIGS. 1 through 3. In FIGS. 4 and 5, reference numeral 1 refers to a groove provided on the side of the terminal 41 of the end cap 33. The groove 1 includes a plane parallel to the axial line of the motor, and formed into a flat shape in such a manner as to open toward a motor housing (not shown). The side surfaces of a pair of terminals 41 and 41 are brought into contact with the side surfaces of the groove 1.

Numeral 2 refers to a spring made of an electrically conductive material, such as copper and a copper alloy, formed into a substantially U shape in planar protection, and fitted into the groove 1. Numeral 3 refers to a chip laminated capacitor formed into a thin rectangular parallelepiped shape, for example, and fitted into the groove 1. With this construction, the chip laminated capacitor 3 is forced toward the terminals 41 and 41 by the resiliency of the spring 2, and held in place between the terminals 41 and 41, together with the chip laminated capacitor 3, forming a circuit for reducing electrical noise. Providing projections 4 on the inside surface of the terminals 41 and 41 is desirable to ensure electrical connection with the spring 2 and the chip laminated capacitor 3.

Figure 6:
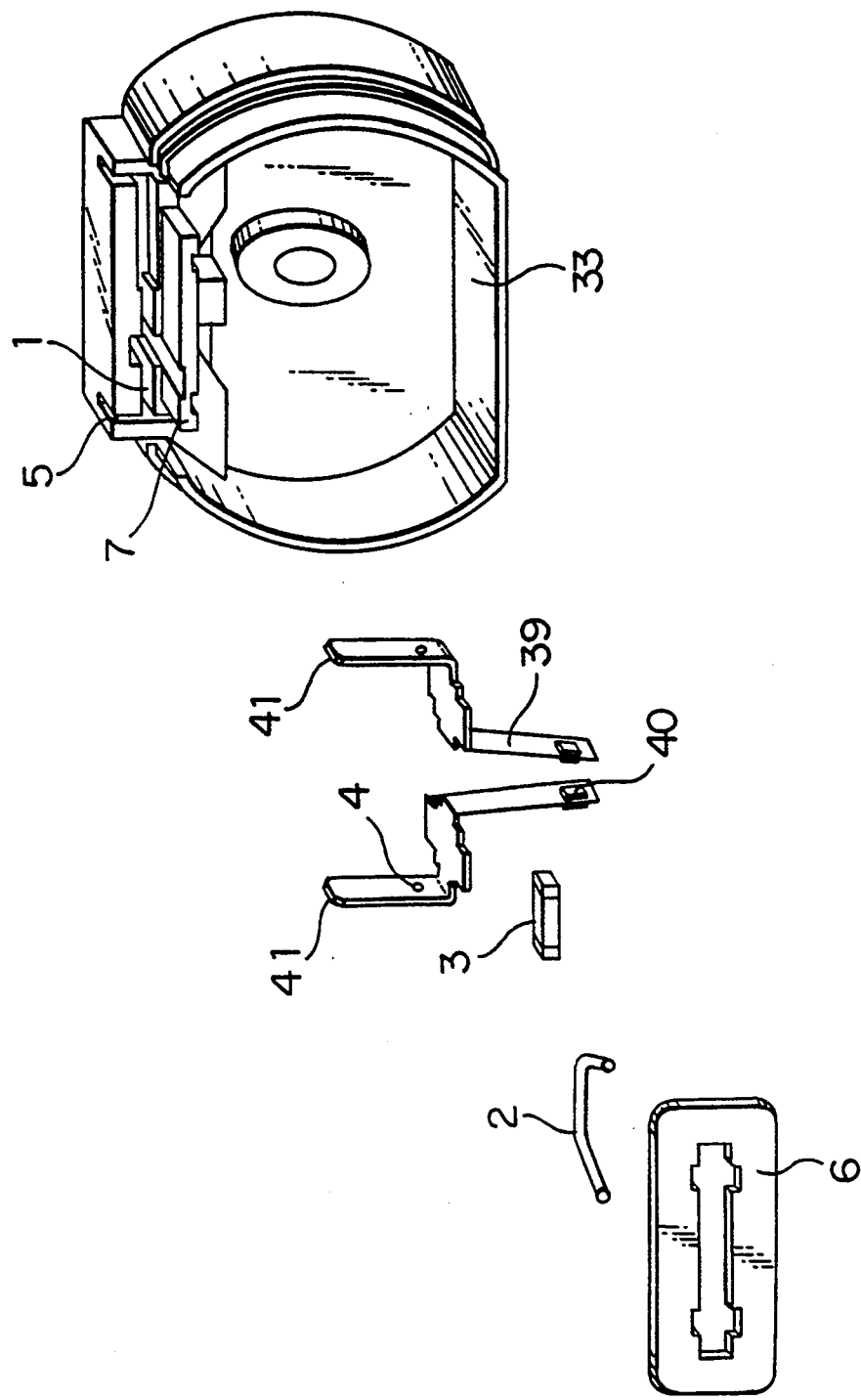
FIG. 6 is a perspective view illustrating the exploded state of members which are to be mounted on the end cap shown in FIGS. 4 and 5.

FIG. 6 is a perspective view illustrating the exploded state of members to be mounted on the end cap 33 shown in FIGS. 4 and 5. In FIG. 6, when the terminals 41 and 41 formed into a substantially L shape and connected to the brush arms 39 and 39 are forced from the side of the inside end face of the end cap 33 into a groove 5 formed in such a manner as to pass through the groove 1 on the end cap 33, then the side surfaces of the terminals 41 and 41 are held in such a fashion as to face the groove 1.

Next, when the chip laminated capacitor 3 is inserted into the groove 1 along the positive terminal 41 (right side in FIG. 6), and the spring 2 is inserted in between the chip laminated capacitor 3 and the negative terminal 41 (left side in FIG. 6), the elastic force of the spring 2 forces the chip laminated capacitor 3 onto one terminal 41, and the spring 2 itself pushes the other terminal 41, ensuring electrical connections of the terminals 41 and 41 with the chip laminated capacitor 3 and the spring 2. An insulating plate 6 is fitted to the projection 7 provided integrally on the inside end face of the end cap 33 to prevent the terminals 41 and 41, the chip laminated capacitor 3 and the spring 2 from falling off and short-circuiting with the housing 31.

This invention having the aforementioned construction and operation can achieve the following effects.

(1) By fitting the chip laminated capacitor between the terminals, electrical noise can be reduced, the performance of miniature motors can be improved.

(2) Since this invention has a construction in which the chip laminated capacitor is incorporated, no excess space is needed outside the miniature motor, and thus it is possible to reduce the size of miniature motors.

(3) Since component members can be assembled easily, manufacturing cost can be reduced and productivity can be improved.

(4) Since the spring for holding the chip laminated capacitor can be formed merely by cutting and bending wires, fabrication cost is low.

What is claimed is:

1. A miniature motor comprising a housing made of a metallic material, formed into a bottom hollow tubular shape and having a permanent magnet fixedly fitted on the inner circumferential surface, a rotor consisting of an armature facing said permanent magnet and a commutator, and an end cap engaged with the open end of said housing and having brushes making sliding contact with said commutator and terminals electrically connected to said brushes; said rotor being rotatably supported by bearings provided on the bottom of said housing and said end cap, characterized in that a flat groove incorporating a plane parallel to the motor axial line and opening toward said housing is provided on said end cap, a pair of terminals are provided in such a manner as to face the side surface of said groove, and a chip laminated capacitor and a spring made of an electrically conductive material and formed into a substantially U shape in planar projection are fitted into said groove in such a manner as to come in contact with each other, and with said terminals.

2. A miniature motor as set forth in claim (1) wherein projections facing said groove are provided on the inside surface of said terminals, and said projections are caused to come in contact with said spring and said chip laminated capacitor.

3. A miniature motor as set forth in claim (1) wherein an insulating plate is fitted to said end cap via a projection integrally provided on the inside end face of said end cap, and the opening of said groove is closed via said insulating plate.

* * * * *